(12) United States Patent
Angelis et al.

(10) Patent No.: US 10,135,315 B2
(45) Date of Patent: Nov. 20, 2018

(54) GENERATOR ASSEMBLY AND BEARING EQUIPPED WITH THE SAME

(71) Applicants: Georgo Angelis, Oss (NL); Nicolaas Simon Willem Den Haak, Zwijndrech (NL); Funda Sahin Nomaler, Eindhoven (NL)

(72) Inventors: Georgo Angelis, Oss (NL); Nicolaas Simon Willem Den Haak, Zwijndrech (NL); Funda Sahin Nomaler, Eindhoven (NL)

(73) Assignee: AKTIEBOLAGET SKF, Gothenburg (SE)

( * ) Notice: Subject to any disclaimer, the term of this patent is extended or adjusted under 35 U.S.C. 154(b) by 227 days.

(21) Appl. No.: 15/052,231

(22) Filed: Feb. 24, 2016

(65) Prior Publication Data
US 2016/0254725 A1 Sep. 1, 2016

(30) Foreign Application Priority Data

Feb. 27, 2015 (GB) ................................ 11503349.1

(51) Int. Cl.
| | | |
|---|---|---|
| *F16C 41/00* | (2006.01) | |
| *H02K 7/08* | (2006.01) | |
| *H02K 7/18* | (2006.01) | |
| *F16C 19/38* | (2006.01) | |

(52) U.S. Cl.
CPC ............. *H02K 7/08* (2013.01); *F16C 41/004* (2013.01); *H02K 7/1846* (2013.01); *F16C 19/38* (2013.01); *F16C 2326/02* (2013.01)

(58) Field of Classification Search
CPC ...... H02K 1/12; H02K 21/225; H02K 7/1846; F16C 2380/26
USPC ........... 384/446, 448; 310/216.021, 216.022, 310/216.023, 216.033
See application file for complete search history.

(56) References Cited

U.S. PATENT DOCUMENTS

| | | | | |
|---|---|---|---|---|
| 1,331,998 A | * | 2/1920 | Neuland | H02K 21/225 123/149 D |
| 5,280,209 A | * | 1/1994 | Leupold | H02K 1/278 310/156.41 |
| 5,440,184 A | * | 8/1995 | Samy | B61D 43/00 310/90 |

(Continued)

FOREIGN PATENT DOCUMENTS

| | | | |
|---|---|---|---|
| CN | 103982542 A | 8/2014 | |
| DE | 102014207209 A1 * | 10/2015 | ........... H02K 7/1846 |

(Continued)

*Primary Examiner* — Burton Mullins
(74) *Attorney, Agent, or Firm* — Bryan Peckjian; SKF USA Inc. Patent Dept.

(57) ABSTRACT

A generator assembly for harvesting energy in a bearing arrangement having a first component and a second component, wherein the first component is configured to rotate in relation to the second component. The generator assembly includes a plurality of coils attached to the first component, wherein the coils are configured to interact with a magnet ring with alternating magnetization directions attached to the second component. In order to achieve an adaptable and flexible design, the coils are placed and oriented such that a winding axis of the coils is oriented in an essentially circumferential direction in relation to a rotation axis of the bearing arrangement.

6 Claims, 2 Drawing Sheets

(56) References Cited

U.S. PATENT DOCUMENTS

| | | | | |
|---|---|---|---|---|
| 5,614,822 A | * | 3/1997 | Sakamoto | G01P 3/443 324/174 |
| 5,886,504 A | * | 3/1999 | Scott | B23K 9/1062 322/15 |
| 5,986,448 A | * | 11/1999 | Yada | G01P 3/443 324/163 |
| 6,535,135 B1 | * | 3/2003 | French | B61K 9/04 340/682 |
| 6,727,632 B2 | * | 4/2004 | Kusase | H02K 1/27 310/112 |
| 2014/0339943 A1 | | 11/2014 | Peczalski | |

FOREIGN PATENT DOCUMENTS

| | | | | |
|---|---|---|---|---|
| EP | 2109213 A2 | * | 10/2009 | H02J 7/1492 |
| EP | 2738934 A1 | | 6/2014 | |
| WO | 2013/160098 A2 | | 10/2013 | |
| WO | WO 2013160035 A2 | * | 10/2013 | H02K 7/1846 |
| WO | 2013/160035 A1 | | 9/2014 | |

* cited by examiner

GENERATOR ASSEMBLY AND BEARING EQUIPPED WITH THE SAME

CROSS REFERENCE TO RELATED APPLICATION

This is a Non-Provisional Patent Application, filed under the Paris Convention, claiming the benefit of Great Britain (GB) Patent Application Number 1503349.1, filed on 27 Feb. 2015 (27.02.2015), which is incorporated herein by reference in its entirety.

FIELD OF THE INVENTION

The invention relates to a generator assembly for use in bearing assemblies and to a bearing equipped with such a generator assembly.

BACKGROUND OF THE INVENTION

It is known to equip bearings with sensors and electronic devices of various types. These devices need to be powered while maintaining the bearing ISO dimensions. Further, the powering solutions should be scalable and cost efficient.

An internal power supply can be implemented by means of a battery, but this limits the "mission time" as the battery life is limited. In addition, the environmental conditions, e.g. high temperatures, are very demanding. A better way of an internal power supply is to generate the required power inside the bearing. The latter approach is also known as Energy Harvesting.

The document U.S. Pat. No. 5,440,184 discloses a double-row tapered roller bearing containing a generator for producing electrical energy. The generator includes a rotor and a stator arranged between the two rows or rollers. The rotor carries a plurality of permanent magnets with alternating polarity and the stator ring is provided with a plurality of teeth separating winding slots and carrying a coil respectively. The teeth and the central axes of the coil are oriented radially inward toward the permanent magnets.

The design proposed in U.S. Pat. No. 5,440,184 is not very flexible and has limited range of functions.

The document WO 2013/160035 discloses a power generating assembly configured to be integrated in a bearing assembly, wherein the power generating assembly interacts with a magnetic wheel comprising magnetically polarized material with alternating directions of polarizations.

SUMMARY OF THE INVENTION

The invention seeks to provide a generator assembly with a flexible design and a wide range of functions and usability.

The invention starts from a generator assembly for harvesting energy in a bearing arrangement having a first component and a second component, wherein the first component is configured to rotate in relation to the second component and vice versa. The generator assembly includes a plurality of coils attached to the first component and configured to interact with a magnet ring with alternating magnetization directions attached to the second component.

The inventors propose that the coils are placed and oriented such that a winding axis of the coils is oriented in an essentially circumferential direction in relation to a rotation axis of the bearing arrangement. The arrangement corresponds to the arrangement of a Lorentz-Type linear motor exploiting Lorentz forces acting on a conductor carrying current in a direction transversal both to an external magnetic field and to the direction of the current. The orientation of the coils is such that the portion of the winding close to the magnet ring experiences a Lorentz force stronger than the Lorentz force acting on the parts of the winding remote from the magnetic ring when the coil passes through the periodically varying magnetic field. The periodic variations of the magnetic field passing through the coil in a circumferential direction of the bearing rings and in an axial direction in relation to the winding axis of the coils translate into periodically varying voltages across the coil and, consequently, to an AC current which can be used for harvesting energy.

The first component and the second component may be an outer ring or an inner ring of a bearing or components rotationally fixed thereto. In other embodiments, one of the components may be a bearing cage or guide ring that is arranged between two sets of rollers in e.g. a double-row spherical roller bearing.

The design according to the invention is highly adaptive because coils can be added or removed in a simple way as they are aligned in a row.

In a preferred embodiment of the invention, the coils are placed on a bar-shaped generator core extending the circumferential direction in relation to a rotation axis of the bearing arrangement. The generator core can be easily adapted to the curvature by bending the core or by using a suitably bent core with the desired length. Preferably, the bar-shaped generator core is a body made by laminating sheets of silicon iron.

The invention seeks to provide a generator assembly which is usable in a very wide range of rotational speeds of the bearing. This requires high efficiency at low rotational speeds and limited currents at high rotational speeds, the latter to avoid damages of subsequent electronic circuits. The inventors propose to intentionally increase losses due to eddy currents at high rotation speeds by using a bar-shaped generator core, which is formed as a body made of a stack of metal sheets which are at least partially unlaminated. The unlaminated portions can be accompanied by laminated portions provided in positions where increased heat transport is required. Further, the invention proposes to intentionally generate losses due to eddy currents by wrapping or packing the coils into an aluminum packing.

In a preferred embodiment of the invention, the length direction of the cross section is oriented in an axial direction in relation to a rotation axis of the bearing arrangement, wherein the coils are preferably would and arranged such that a portion of the coil wire arranged closest to the magnet ring is straight, i.e. shaped such that it runs straight in the axial direction.

In the preferred embodiment of the invention, the magnetization directions are oriented radially in relation to an axis of rotation of the bearing arrangement.

The magnet ring can be manufactured easily and with high precision if the magnet ring includes a back iron ring and a plurality of permanent magnets attached thereto. In a preferred embodiment of the invention, the magnet ring includes a plurality of permanent magnets arranged in a Halbach configuration.

The invention further proposes that the generator assembly comprises a rectifier and a voltage regulator adapted to transform an input voltage induced in the coils to an essentially constant terminal voltage.

For typical applications, the bearing speed range within which the harvested energy is required is between 120 rpm and 3400 rpm. These numbers determines the min/max voltage range for the electronics design. The required output DC voltage range is typically between 2.5 Volts and 5.5 Volts and determines the coil number of turns which directly related to the voltage generation at given speed range. The power available within the defined speed range should typically be 50 mW and can be achieved by adapting the size of the energy harvester. For typical wheel bearing applications, the operation temperature is between −20° C. and 85° C. The choice of permanent magnet grade against demagnetization should account for this temperature range, wherein possible peak temperatures of 120° C. or 140° C. should be possible.

The typical storage temperature is between −40° C. and 85° C. and should be accounted for when determining the specification of storage and transport conditions for glue used between magnets and steel ring.

A challenging aspect of the conversion is the large speed-range of the bearings. At the lower-end, the harvester is expected to be operational starting at 120 RPM. As the volume available for harvesting is limited, there is a physical limit on the power that can be scavenged at this lowest speed. Since power scales as the square of the EMF, each percent of voltage-drop incurred in the converter diminishes the available by ~two percent. For this reason, it is advantageous to generate a not-too-little EMF, so that the (minimal) voltage-drop in the convertor does not constitute a large percentile drop in the available power.

At the upper end, the bearing shall be running at 3400 RPM (28.3× faster than the lowest operational speed). With tolerances, system-variables (e.g. temperature) and safety-margins, and the ratio between the lowest and highest EMF becomes about 1:50. This number includes margins allowed for increased scavenging due to factors such as cold temperatures, narrower air-gaps and slight over-speeding.

Designing electronics that can survive the highest EMF is, in itself, no trivial task. Preferably, the impedance generator assembly is matched to the expected impedance of the load using the maximum power-transfer theorem, i.e. such that the maximum power can be transferred from source to load. According to one aspect of the invention, it is proposed to chose a wire-thickness such that the resistance of the entire source (one or more pickup coils) is equal to the anticipated load-resistance.

Rectification converts the AC electromotive force (EMF) picked up by the harvester to DC. The rectifier of the assembly according to the invention uses Schottky diodes that inherently have a low forward drop. In further embodiments of the invention, it would be possible to use synchronous rectifiers that use active switches (field-effect transistors) to reduce the forward drop even further if the necessary quiescent power to control the switches were available.

According to a further aspect of the invention, capacitors in the rectifier are avoided because these risk to be bulky or susceptible to ageing. The capacitors have the additional disadvantage of resulting in current-peaks while charging, thereby reducing the overall efficiency and utilization of the source.

The range of manageable rotational speeds can be strongly increased by adding a pre-regulator circuit to the electronics. This circuit-topology should preferably address the following specific challenges:

The circuit should not require much power to operate (<1 mW), especially when at low-speed
The circuit should be active (operational) at the lowest supply-EMF (at the lowest speed) (at Uin >=2V)
Any "series-pass" elements it may have should not add significant voltage-drop (<0.1V) and
The circuit should not add significant cost or volume.

According to one aspect of the invention the pre-regulator circuit is adapted to disconnect at least some of the coils if a rotation speed of the bearing assembly exceeds a predetermined threshold value. The disconnected coils do not contribute to the energy generation such that the overall efficiency is reduced. This leads to reduced output voltages and output currents and consequently helps to avoid damages in the circuitry.

The inventors further propose to change the polarity of at least one of the coils at high rotational speeds such that the coil with changed polarity will cancel the contribution of another coil.

The inventors have found that a particularly stable and efficient generator assembly can be achieved by connecting a group of at least three of the coils as a tree-phase circuit. Preferably, the number of coils is an integer multiple of three and all of the coils are star-connected in a three-phase circuit in pertinent groups.

According to a further aspect of the invention the generator assembly or energy harvester that is integrated in a bearing end-cap or seal.

Energy is harvested from the speed difference between the two bearing rings. The device contains a magnetized rotor and a bar shaped stator. In the bar shaped stator the electricity is generated by means of electromagnetic induction. The harvested energy can be used for various appliances, among others: sensors, controllers and wireless data transmission. A magnetic field is created by the permanent magnet rotor or magnet ring. The magnets are assembled in alternating configuration, i.e. with the magnetization directions of adjacent magnets pointing in opposite directions. The magnetic field is attracted by a metal bar that is aligned circumferentially with the rotor.

Coils are wound around the metal bar or fitted over the metal bar, i.e. such that a central winding axis of the coil is oriented in the circumferential direction of the bearing and the coils have a length in the circumferential direction equal or less than the magnet length.

Electrically, the coils are wound in opposite direction. i.e. adjacent coils have opposite polarity.

When the magnet ring rotates, the bar-shaped generator core 'sees' a periodically changing flux that generates an EMF voltage in the coils. The EMF voltage is linearly dependent on speed. The speed range of bearings is relatively big, which creates problems in the power electronics. Preferably, the power electronics should be able to generate and manage voltages between 1.5-3 and 75-90V.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE EMBODIMENTS

Figure 1:
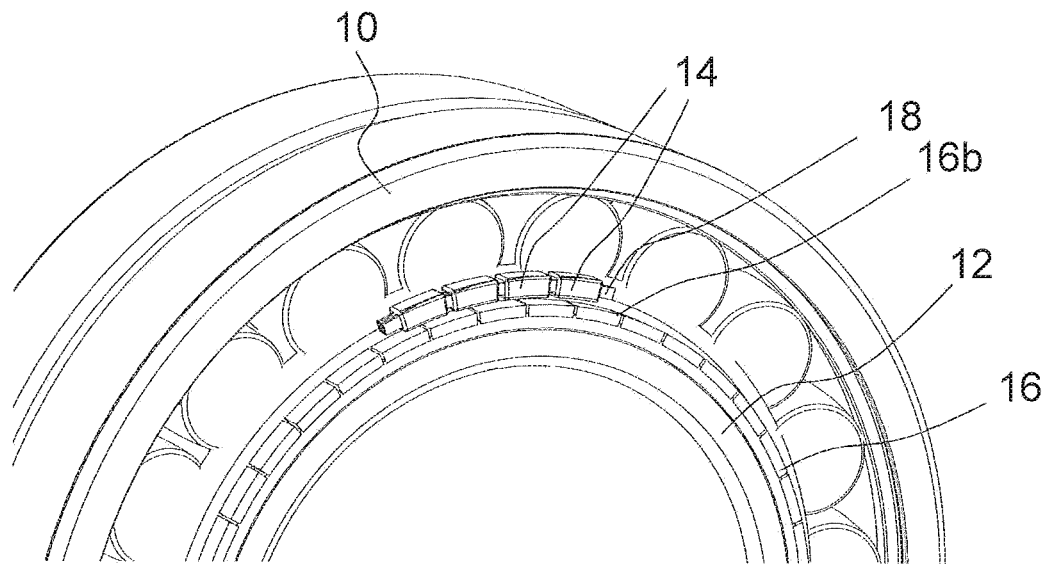
FIG. 1 is a perspective view of a generator assembly according to the invention mounted to a bearing.

FIG. 1 shows a generator assembly for harvesting energy in a bearing arrangement having an outer ring as a first component 10 and an inner ring as a second component 12. The generator assembly includes a plurality of coils 14 attached to the first component 10 and configured to interact with a magnet ring 16 with alternating magnetization directions attached to the second component 12.

The coils 14 are placed on a bar-shaped metal generator core 18 and oriented such that a winding axis of the coils is oriented along the generator core 18 in an essentially circumferential direction in relation to a rotation axis of the bearing arrangement.

Figure 2:
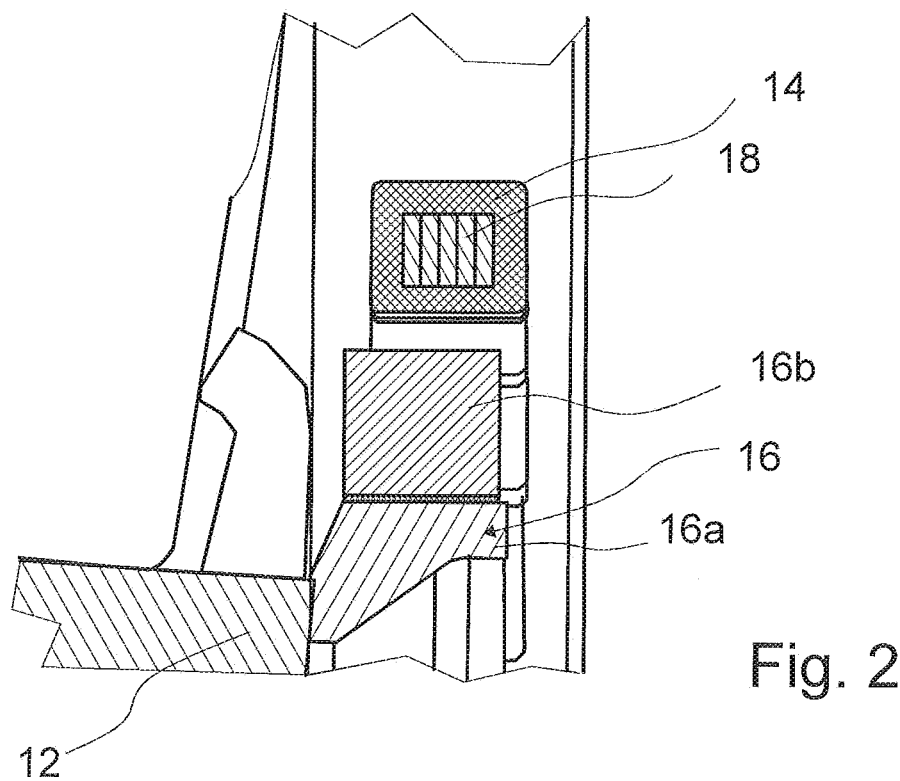
FIG. 2 is a sectional view of the generator assembly according to FIG. 1.

As shown in the sectional view of FIG. 2, the bar-shaped generator core 18 is an arc-shaped body made by laminating sheets of silicon iron. The bar-shaped generator core 18 extends in the circumferential direction in relation to a rotation axis of the bearing arrangement. The generator core 18 may have unlaminated portions. Potentially, the bar can be bent into any radius in order to fit a wide range of bearings. In addition, the design is modular. Multiple blocks (e.g. blocks with five coils on one generator core) can be combined.

The coils 14 have orthocyclic windings with a high filling factor and an elongate or quadratic cross-section in a section perpendicular to their winding axis as shown in FIG. 2. A portion of the coil wire arranged closest to the magnet ring 16 is straight such that the fraction of the circumferential component of the magnetic flux of the magnet ring 16 caught by the coil is maximized.

The magnet ring 16 includes a back iron ring 16a and a plurality of permanent magnets 16b attached thereto. The magnetization directions of the permanent magnets 16b are alternatingly oriented radially outward and inward in relation to an axis of rotation of the bearing arrangement and/or in a Halbach configuration.

The generator assembly or energy harvester as described above is integrated in a bearing end-cap or seal. The dimensional design requirements for the intended use is in bearings is strictly limited by the standard bearing dimensions. In one typical example, the harvester width is maximum 4.3 mm, the outer radius of the rotational unit (rotor) is max. 65.5 mm, the inner radius of magnet ring 16 can be minimum 58 mm, and the stator of the harvester should be an arc and maximum angular span is 180 degrees.

Figure 3:
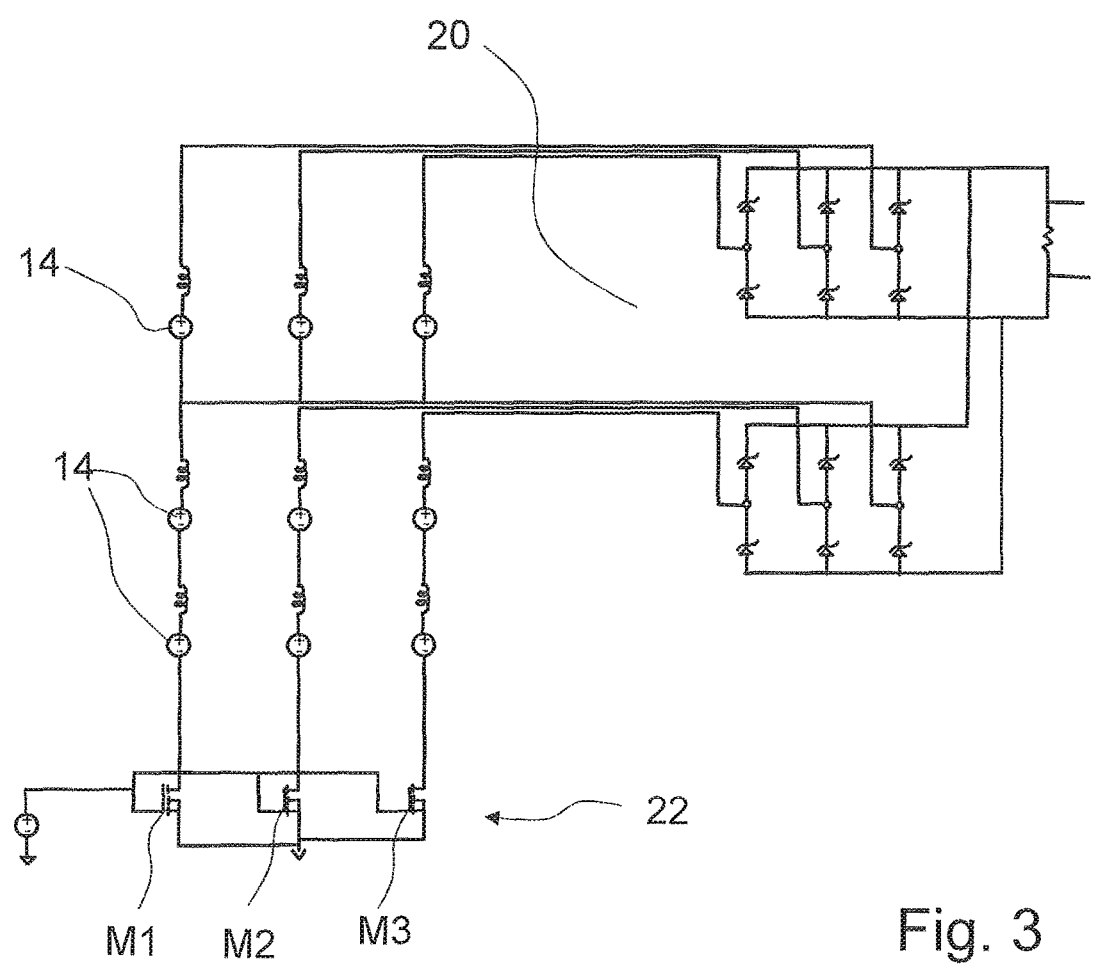
FIG. 3 is a schematic concept of a regulator and pre-regulator circuit of a generator assembly according to the invention.

The generator assembly further includes a rectifier 20 and a voltage regulator adapted to transform an input voltage induced in the coils to an essential constant terminal voltage as illustrated in FIG. 3.

The harvester-design discussed so far is about being able to produce electrical power as a consequence of bearing-rotation. This power needs to be conditioned before it is useful for driving electronic devices. The generated electromotive force (EMF) is, by nature of the harvesting transducer, an alternating (AC) voltage, proportional in frequency and amplitude to the angular speed of the bearing. This typically needs to be transformed to a DC-voltage—between 2.5V and 5V—to be useful for powering electronic devices.

The speed range from 120 rpm to 3400 rpm is a fairly large range considering the fact that the generated voltage is directly proportional to the speed, and the power is proportional to the square of the speed. The problem brought about with this extensive speed range is that, there is not enough power with modest magnetic design, i.e. low number of coils 14 and low cost and lower grade magnet ring 16 unless any energy storage is used. On the other hand, at higher speeds (higher than 450 rpm), it is clear that the required power of 50 mW can be easily reached even when allowing for some losses.

In order to meet the requirements above, the electronic circuit includes a pre-regulator circuit 22 adapted to disconnect at least some of the coils 14 if a rotation speed of the bearing assembly exceeds a predetermined threshold value the pre-regulator circuit 22 with various stages of rectifiers is shown in FIG. 3. The pre-regulator 22 can be seen as an "enabler" for a generator design for bearings whereby a single magnetic and electronic design is usable for the entire speed-range of the bearings.

The coils 14 are divided in groups of three and are connected as a tree-phase circuit, respectively. The generator assembly according to this embodiment avoids capacitors by placing the pickup-coils 14 in the three-phase circuit of FIG. 3. Due to the phase-offset of each of the coils 14, dips in the rectified voltage are avoided, and the need for a storage-device (capacitor) is obviated.

The coil assembly according to the invention corresponds to a 3-phase pickup-coil, each phase consisting of n elements. These elements are daisy-chained; the links may be seen as a "multi-tap" output, each subsequent 'tap' offering increased voltage. To allow the coils 14 to function at the lowest speed, the rectifier-diodes should be placed at the taps that generate the maximum EMF, i.e. on the extremities of a star-connected circuit. When the EMF gets too high, the extremities are disconnected and the diodes do not feel this increased EMF. Instead, other (lower) taps are connected into the rectifier to seamlessly continue powering the load.

This is done using solid-state devices M1 M2 M3 are depletion-mode MOS devices. When no stimulus is present (i.e. during low-speed startup), they are ON. This avoids extra dissipation when power is scarce. The "ground" point in the circuit of FIG. 3 is the (conditional) "star" point of the three-phase machine. All the pickup-coils 14 in each branch (i.e. (n=p+q)) actively contribute to generate power.

When enabled, the gate-drive shall switch OFF the MOS-devices M1, M2, M3. A single device may be used to power all three MOS-devices M1, M2, M3. This can be an optical device giving a galvanic isolation between the rectified output (where the decision-making happens) and the star-point (where switching is needed).

When M1 M2 M3 are turned OFF, only 3× 'p' pickup-coils contribute to scavenging.

What is claimed is:

1. A generator assembly for harvesting energy in a bearing arrangement having a first component and a second component configured to rotate in relation to the first component, the generator assembly including:
   a plurality of coils attached to the first component, the plurality of coils are placed on a bar-shaped generator core extending a circumferential direction in relation to a rotation axis of the bearing arrangement, a winding axis of the plurality of coils is oriented in a circumferential direction in relation to a rotation axis of the bearing arrangement, the plurality of coils are configured to interact with a magnet ring with alternating magnetization directions attached to the second component;
   a rectifier transforming an input voltage induced in the plurality of coils to a constant terminal voltage; and
   a pre-regulator circuit
   disconnecting at least some of the plurality of coils when a rotation speed of the bearing assembly exceeds a predetermined threshold value,
   wherein the plurality of coils is divided in groups of three and connected as a three-phase circuit to provide a phase-offset for the plurality of coils that avoids dips in a rectified voltage and eliminates capacitors.

2. The generator assembly according to claim 1, wherein the bar-shaped generator core is a body made by laminating sheets of silicon iron.

3. The generator assembly according to claim 1, wherein the plurality of coils are wound on a portion of a coil wire on a magnet ring side in an axial direction in a straight shape.

4. The generator assembly according to claim 1, the magnet ring further comprising a back iron ring and a plurality of permanent magnets attached thereto.

5. A bearing assembly including:
   a bearing,
   at least one sensor for determining an operating parameter of the bearing;
   at least one electronic device for at least one of (a) processing signals of the sensor and (b) transmitting signals of the sensor; and
   a generator assembly comprising:
      a plurality of coils attached to a first component, the plurality of coils are placed on a bar-shaped generator core extending a circumferential direction in relation to a rotation axis of the bearing arrangement, a winding axis of the plurality of coils is oriented in a circumferential direction in relation to a rotation axis of the bearing arrangement, the plurality of coils are configured to interact with a magnet ring with alternating magnetization directions attached to the second component;
      a rectifier transforming an input voltage induced in the plurality of coils to a constant terminal voltage; and
      a pre-regulator circuit disconnecting at least some of the plurality of coils when a rotation speed of the bearing assembly exceeds a predetermined threshold value,
   wherein the plurality of coils is divided in groups of three and connected as a three-phase circuit to provide a phase-offset for the plurality of coils that avoids dips in a rectified voltage and eliminates capacitors.

6. The bearing assembly according to claim 5, wherein the generator assembly is integrated in an end cap of the bearing.

\* \* \* \* \*